United States Patent [19]
Saizon

[11] Patent Number: 6,019,673
[45] Date of Patent: Feb. 1, 2000

[54] CRAB CRACKER

[76] Inventor: Floyd S. Saizon, Baton Rouge, La.

[21] Appl. No.: 09/271,185

[22] Filed: Mar. 17, 1999

[51] Int. Cl.⁷ .................................................. A22C 29/02
[52] U.S. Cl. ............................. 452/6; 452/17; 30/120.1; 81/9.44
[58] Field of Search .................. 452/6, 17; 30/112, 30/120.1, 120.3, 120.5, 186, 248, 244; 81/9.4, 9.44

[56] References Cited

U.S. PATENT DOCUMENTS

| | | | |
|---|---|---|---|
| 198,678 | 12/1877 | Poole . | |
| 1,219,857 | 3/1917 | Parkhurst . | |
| 2,753,905 | 7/1956 | Awoerjon . | |
| 3,395,421 | 8/1968 | Harlness, Jr. . | |
| 3,685,097 | 8/1972 | Scott et al. | 452/17 |
| 3,706,114 | 12/1972 | Waechter | 452/17 |
| 4,103,395 | 8/1978 | Lajorella . | |
| 4,519,136 | 5/1985 | Walker | 30/142 |
| 4,716,627 | 1/1988 | Scott, Jr. . | |
| 5,108,343 | 4/1992 | Gilliam | 452/6 |

*Primary Examiner*—Willis Little
*Attorney, Agent, or Firm*—Reginald F. Roberts, Jr.

[57] ABSTRACT

A utensil for cracking the shells of crabs, lobsters, and other shellfish. A pair of handles are pivotally connected, each handle having a jaw with a tapered cutting edge for cracking the shells without severing the meat which the shells contain. The handles are bent in such a way as to prevent complete closure of the jaws, so that the shell is cracked while leaving the meat of the shellfish intact. This construction also facilitates using the bent ends of the handles for extracting the meat from the cracked shell. For this purpose the bent ends of the handles are bevelled, and taper from wide to narrow in a direction away from their jaws and toward their free ends. When the crab cracker is ready for storage, the bent handles are locked by forcing them apart and placing them in a parallel position. This enables the crab cracker to be easily and neatly stored in a minimum of space.

11 Claims, 2 Drawing Sheets

1

CRAB CRACKER

BACKGROUND OF THE INVENTION

The present invention relates to shellfish. More particularly, the invention relates to a utensil for cracking the shell of a shellfish.

The prior art discloses a number of such utensils, but none which has the capability of cracking the shell without severing the meat contained therein. The present invention provides such a utensil.

SUMMARY OF THE INVENTION

The term "crab" is defined and used generically herein to signify and include all types of shellfish.

The present invention in a first aspect provides a crab cracker for cracking a crab shell having crab meat disposed therein. The crab cracker comprises an arcuate first handle having a first jaw which includes an angular and tapered cutting edge for cracking the crab shell without severing the crab meat disposed therein; and a second handle having a second jaw which includes an angular and tapered cutting edge for cracking the crab shell without severing the crab meat disposed therein. The first and second handles are pivotally connected to one another with the angular cutting edges facing in opposite directions. The arcuate structure of the first handle prevents complete closure of the jaws and severance of the crab meat while in use, and provides for locking and storing the crab cracker when not in use.

In a second aspect the invention provides a method for cracking the shell of a shellfish without severing meat disposed therein. The method comprises: (a) providing an arcuate first handle having a first jaw which includes an angular and tapered cutting edge constructed and arranged to crack the shell without severing the meat disposed therein; and a second handle having a second jaw which includes an angular and tapered cutting edge constructed and arranged to crack the shell without severing the meat disposed therein; (b) pivotally connecting the first and second handles to one another in a configuration such that the angular cutting edges face in opposite directions, and the arcuate structure of the first handle prevents complete closure of the jaws, thereby preventing severance of the meat; and (c) manipulating the first and second handles and the first and second jaws to crack the shell without severing the meat disposed therein.

DETAILED DESCRIPTION OF THE INVENTION

Figure 1:
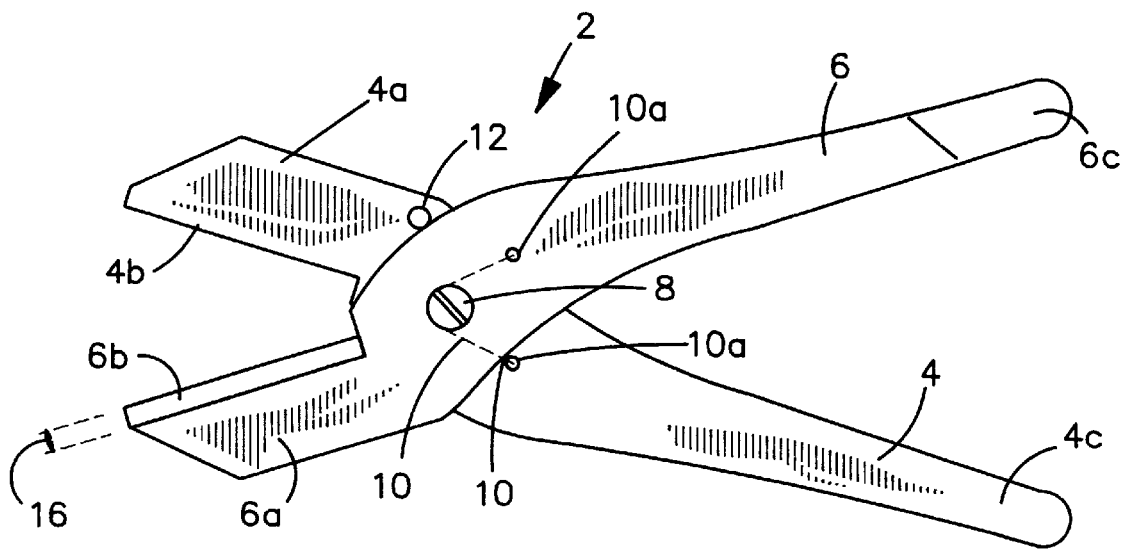
FIG. 1 is a schematic representation of a crab cracker in a fully-opened configuration, made in accordance with the principles of the present invention.

More specifically, reference is made to FIGS. 1–5, in which is shown a crab cracker made in accordance with the principles of the present invention and generally designated by the numeral 2.

The crab cracker 2 comprises a bevelled, arcuate first handle 6 having a first jaw 6a which includes an angular and tapered cutting edge 6b for cracking the shell of a crab or other shellfish (not shown) without severing the crab meat disposed therein; and a bevelled second handle 4 having a second jaw 4a which includes an angular and tapered cutting edge 4b for cracking the crab shell without severing the crab meat disposed therein. The first and second handles 6 and 4 are pivotally connected to one another by a nut 14 and a bolt 8 disposed in openings 8a, with the angular cutting edges 6b and 4b facing in opposite directions, and with the arcuate structure of the first handle 6 preventing complete closure of the jaws 6a and 4a and thereby preventing severance of the crab meat.

Figure 2:
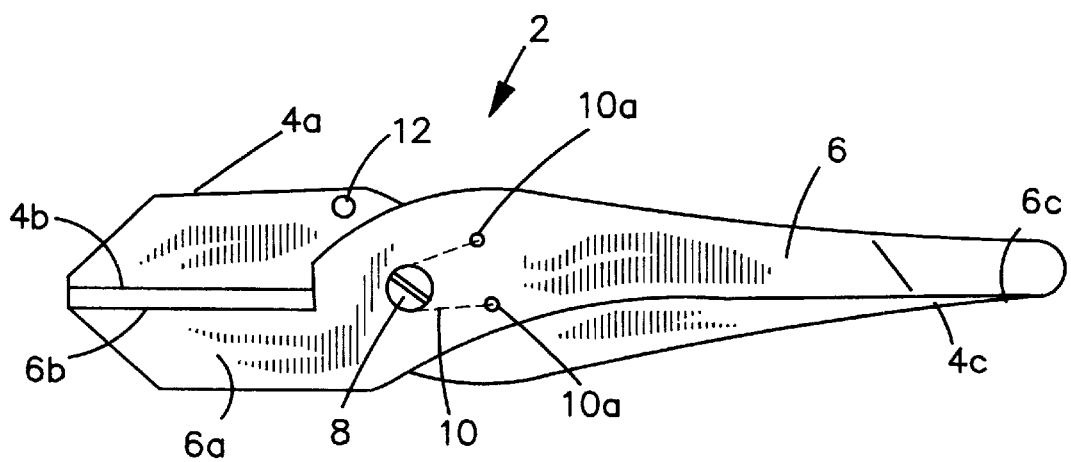
FIG. 2 is a schematic representation of the crab cracker shown in FIG. 1 in a closed and locked configuration.
Figure 5:
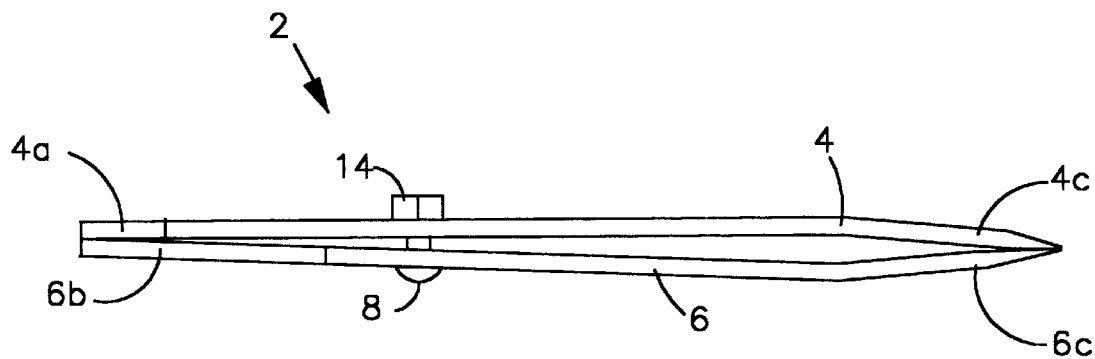
FIG. 5 is a schematic representation of the crab cracker shown in FIG. 1 as viewed from above.

The arcuate first handle 6 is connected to the second handle 4 in an orientation such that the first handle 6 defines an arc 4d which is concave with respect to the second handle 4 and to the crab cracker 2. Preferably both first and second handles 6 and 4 are bent so as to have an arcuate construction, as best seen in FIG. 5. Besides preventing complete closure of the jaws 6a and 4a while the crab cracker 2 is being manipulated and used for cracking a crab shell, the arcuate structure of the first handle 6 or of both handles 6 and 4 serves a second important purpose and performs a second important function. If and when the handles 6 and 4 are forced apart and put in a parallel configuration, they become locked, thereby beneficially enabling the crab cracker 2 to be easily and neatly stored in a minimum of space. This configuration is shown in FIG. 2.

The angular cutting edge 6b, 4b of each jaw 6a, 4a defines an angle 16 having a magnitude of from about forty to about fifty degrees, as best seen in FIG. 1.

Figure 3:
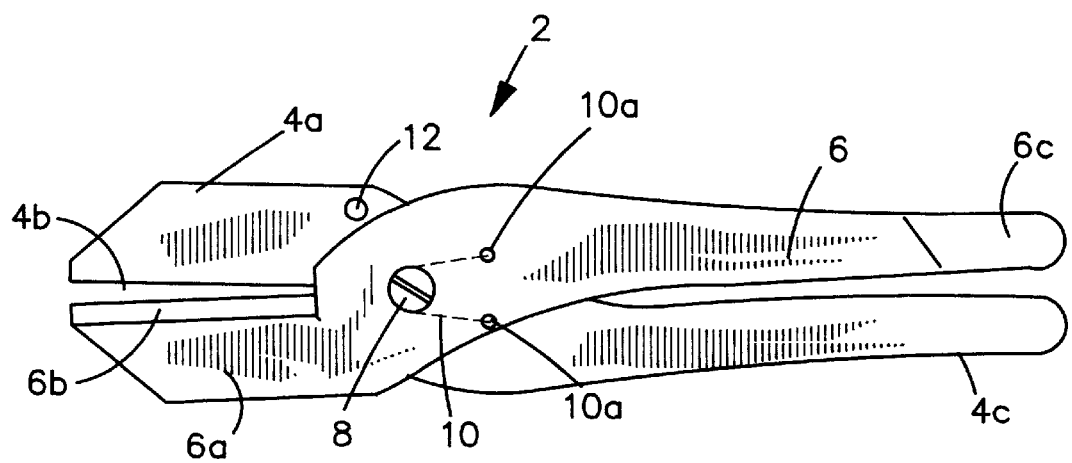
FIG. 3 is a schematic representation of the crab cracker shown in FIG. 1 in an operating configuration.
Figure 4:
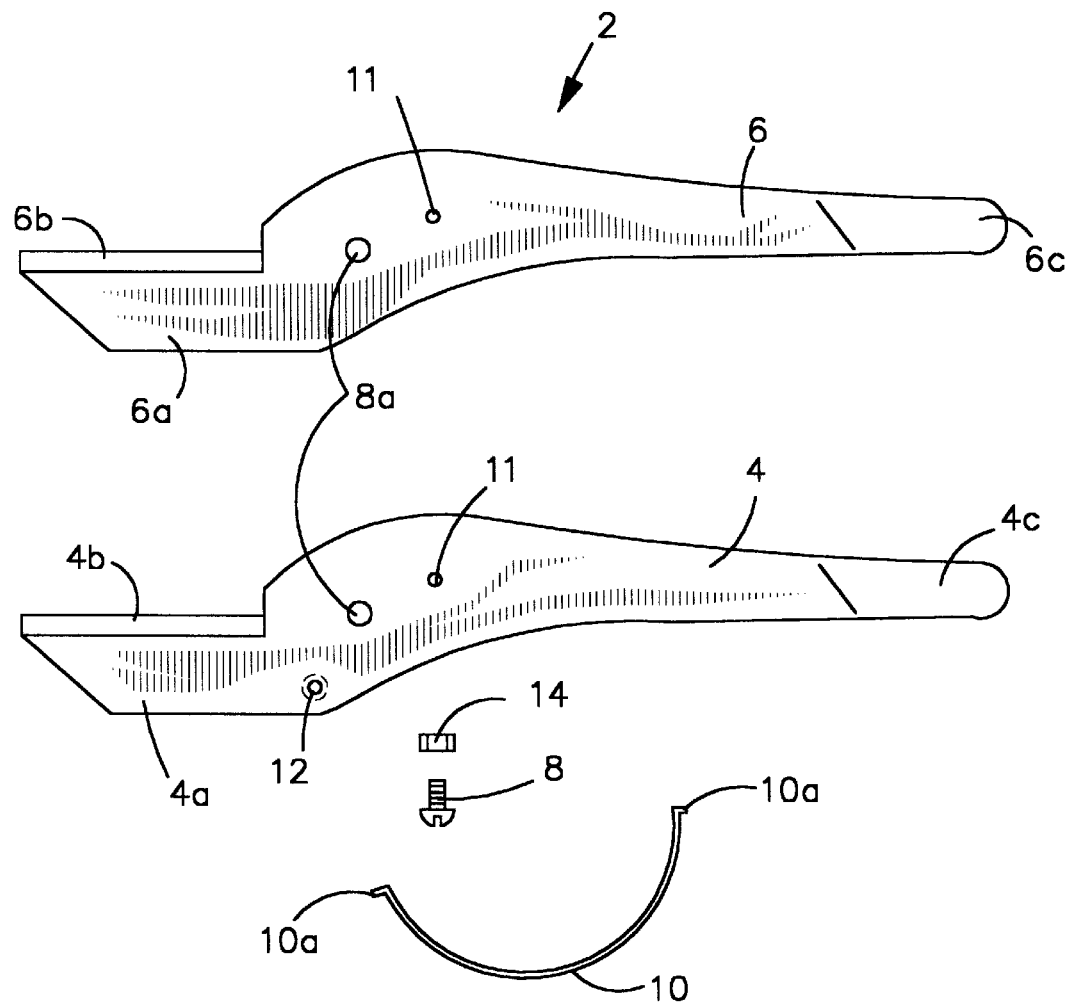
FIG. 4 is an exploded schematic representation of the crab cracker shown in FIG. 1.

The first 6 and second 4 handles are connected in an orientation such that the angular cutting edges 6b and 4b of the first 6a and second 4a jaws taper from wide to narrow in opposite directions, as best seen in FIG. 3.

The crab cracker 2 includes a spring 10 for urging the first 6a and second 4a jaws into an open configuration, as well as stop means 12 for limiting the extent to which the first 6a and second 4a jaws are capable of opening. Ends 10a of the spring 10 are disposed in and attached to openings 11 in the first 6 and second 4 handles.

The bevelled and arcuate ends 6c and 4c of the first and second handles 6 and 4 taper from wide to narrow in a direction away from the first and second jaws 6a and 4a. The bevelled and arcuate ends 6c and 4c of the handles 6, 4 are constructed and arranged for extracting the crab meat after the shell of the crab has been cracked by the jaws 6a and 4a.

The crab cracker 2 is used to crack the shell of a shellfish and to extract the meat therefrom in the following manner. The first and second handles 6 and 4 are manipulated to engage and crack the shell between the angular cutting edges 6b and 4b of the first and second jaws 6a and 4a. The bevelled ends 6c and 4c of the first and second handles 6 and 4 are then used to engage and extract the intact meat from the cracked shell.

Preferably, the crab cracker 2 is made of plastic. Even more preferably, the crab cracker 2 is made from a thermoplastic material by injection molding.

I claim:

1. A crab cracker for cracking a crab shell having crab meat disposed therein, the crab cracker comprising:

(a) an arcuate first handle having a first jaw which includes an angular and tapered cutting edge for cracking the crab shell without severing the crab meat disposed therein; and (b) a second handle having a second jaw which includes an angular and tapered cutting edge for cracking the crab shell without severing the crab meat disposed therein, the first and second handles being pivotally connected to one another with the angular cutting edges facing in opposite directions, the arcuate structure of the first handle preventing complete closure of the jaws and severance of the crab meat while in use, and providing a mechanism for locking the first and second handles when the first and second handles are forced apart and put in a parallel configuration, thereby enabling the crab cracker to be easily and neatly stored in a minimum of space when the crab cracker is not in use, the arcuate first handle being connected to the second handle in an orientation such that the first handle defines an arc which is concave with respect to the second handle and to the crab cracker.

2. The crab cracker of claim 1, wherein:

(c) the angular cutting edge of each jaw defines an angle having a magnitude of from about forty to about fifty degrees.

3. The crab cracker of claim 1, wherein:

(c) the first and second handles are connected in an orientation such that the angular cutting edges of the first and second jaws taper from wide to narrow in opposite directions.

4. The crab cracker of claim 1, further comprising:

(c) a spring for urging the first and second jaws into an open configuration.

5. The crab cracker of claim 1, further comprising:

(c) stop means for limiting the extent to which the first and second jaws are capable of opening.

6. The crab cracker of claim 1, wherein:

(c) the first and second handles have arcuate free ends which are bevelled and taper from wide to narrow in a direction away from the first and second jaws, to provide means for extracting the crab meat after the shell of the crab has been cracked by the angular cutting edges of the first and second jaws.

7. A method for cracking the shell of a shellfish without severing meat disposed therein, the method comprising the steps of:

(a) providing an arcuate first handle having a first jaw which includes an angular and tapered cutting edge constructed and arranged to crack the shell without severing the meat disposed therein; and a second handle having a second jaw which includes an angular and tapered cutting edge constructed and arranged to crack the shell without severing the meat disposed therein;

(b) pivotally connecting the first and second handles to one another in a configuration such that the angular cutting edges face in opposite directions, and the arcuate structure of the first handle prevents complete closure of the jaws, thereby preventing severance of the meat; and (c) manipulating the first and second handles and the first and second jaws to crack the shell without severing the meat disposed therein.

8. A method for cracking the shell of a shellfish without severing meat disposed therein, the method comprising the steps of:

(a) providing an arcuate first handle having a first jaw which includes an angular and tapered cutting edge constructed and arranged to crack the shell without severing the meat disposed therein; and a second handle having a second jaw which includes an angular and tapered cutting edge constructed and arranged to crack the shell without severing the meat disposed therein, the arcuate first handle being connected to the second handle in an orientation such that the first handle defines an arc which is concave with respect to the second handle;

(b) pivotally connecting the first and second handles to one another in a configuration such that the angular cutting edges face in opposite directions, and the arcuate structure of the first handle prevents complete closure of the jaws, thereby preventing severance of the meat; and (c) manipulating the first and second handles and the first and second jaws to crack the shell without severing the meat disposed therein.

9. The method of claim 7, wherein the first and second handles are connected in an orientation such that the angular cutting edges of the jaws of the first and second handles taper from wide to narrow in opposite directions.

10. The method of claim 7, wherein the angular cutting edge of each jaw defines an angle having a magnitude of from about forty to about fifty degrees.

11. The method of claim 7, further comprising the steps of:

(d) bending and tapering free ends of the first and second handles from wide to narrow in a direction away from the first and second jaws, to provide means for extracting the meat of the shellfish after the shell has been cracked by the angular cutting edges of the first and second jaws; and (e) extracting the meat of the shellfish with the tapered ends of the first and second handles.

* * * * *